July 3, 1956

V. L. LAWRENCE 2,753,115

EGG COUNTER

Filed June 6, 1955

VERNE L. LAWRENCE
INVENTOR.

BY Stedman B Hoar

AGENT

United States Patent Office 2,753,115
Patented July 3, 1956

2,753,115

EGG COUNTER

Verne L. Lawrence, Los Angeles, Calif.

Application June 6, 1955, Serial No. 513,522

4 Claims. (Cl. 235—124)

This invention relates to a device for counting eggs, and has as its principal object the provision of a simple inexpensive device which may be attached to the lay-cage of a hen and which will afford the poultryman a continuous record of the hens' egg-laying proclivities. A further object of the invention is to provide a recording device which may be operated by a finger or even by the back of the hand, thus leaving the poultryman's hands free for the collection of eggs and saving greatly on his time. Still another object is to provide a device which at a glance will show the poultryman which hens are his best layers and which are proper candidates for the poultry market.

In its simplest and presently preferred form, my improved egg counter comprises a downwardly inclined undulating wire, upon which a marker or weight is hung. A handle is provided for oscillating the wire a half-turn each time an egg is picked up, causing the weight to move by gravity a half-undulation toward the lower end of the wire. Resistance means are provided to prevent the counter from being turned accidently. Zones of the wire may be painted in different colors, indicative of poor, satisfactory, and good performance of the hen over a fixed period of time, such as a fortnight.

On many farms small children are given such chores as collecting eggs, and as will be seen, the present invention may be used by a child, demanding no more mental or physical effort than is required to flip a handle as the eggs are collected. While devised as an egg counter, it may be employed in numerous other uses demanding a rapid but short tally for later evaluation.

In the accompanying drawing, illustration of a preferred embodiment of my invention, Fig. 1 is a perspective frontal view of my egg counter attached to a lay-cage;

Figure 1:
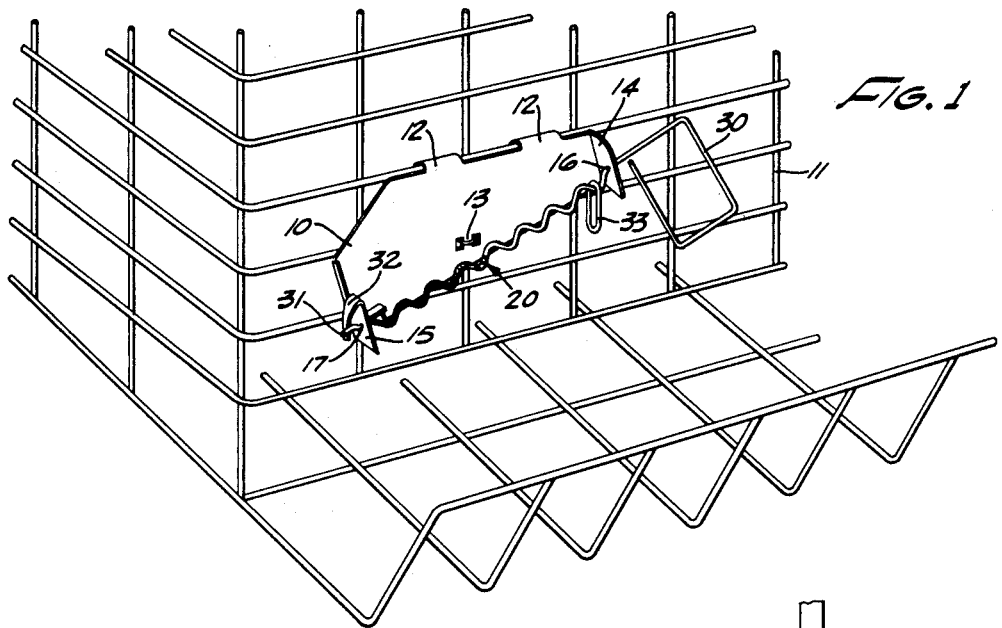

Having reference now to the details of the drawing, my improved egg counter comprises a plate 10 adapted to hang vertically on the front of a lay-cage 11 and having ears or hooks 12 by which it may be suspended from one of the wires of the cage. Preferably also it has a stamped-out ear or hook 13 to engage one of the vertical wires of the lay-cage and to hold it firmly in place. At the two ends of the plate 10 are parallel ears 14 and 15, both inclined from the vertical, the ear 15 being on a lower level than the ear 14. The ear 14, has a hole 16 which serves as a bearing and the ear 15 has a similar bearing hole 17. The bearing 16 is above the bearing 17 but aligned with it.

Figure 2:
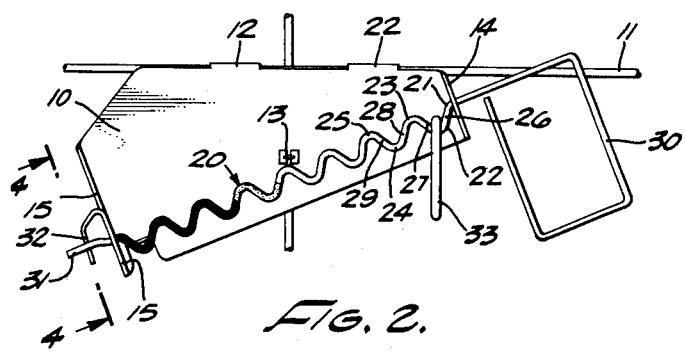
Fig. 2 is a frontal elevational view showing the egg counter in its initial position at the beginning of a tally.
Figure 4:
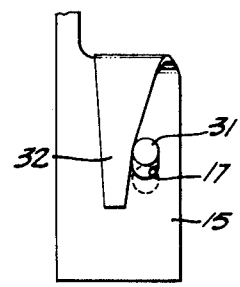
Fig. 4 is an end view taken on the line 4—4 of Fig. 2, and showing the means for preventing accidental turning of the device.
Figure 3:
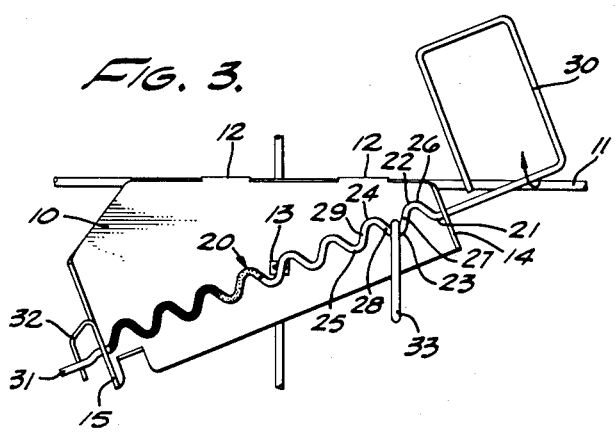
Fig. 3 is a similar view showing the egg counter one-half an oscillation later than Fig. 2, indicating that one egg has been picked up.
Figure 5:
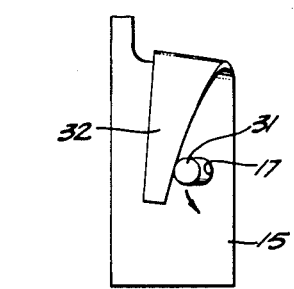
Fig. 5 is a similar view showing the same means in the contact with a resilient finger.

Mounted rotatably in the bearing holes 16 and 17 is a rod 20, inclined from the horizontal. That portion of the rod 20 lying between the bearings 16 and 17 is bent in a series of undulations, all lying in the same plane. The rod 20 is shown in Fig. 2 as bent downwardly for a short distance as at 21; then it curves upwardly with an approximately right angle turn as at 22, then downwardly as at 23, then upwardly as at 24, then downwardly as at 25, and so on to approximately the bearing 17, the parts 26, 27, 28, 29, etc. between the bends 21, 22, 23, 24, 25, etc. being of the same length and in the same plane, and the bends 21, 22, 23, 24, 25, etc. being rounded. The bottom of each downwardly extending undulation so formed in downward progression lies below the crest of the next succeeding upwardly extending undulation, the bend 22 for example being shown in Fig. 2 as below the bend 23. Obviously, if the rod 20 is rotated 180 degrees in the bearings 16 and 17, the undulations 22 and 24 shown as bottoms in Fig. 2 will become crests as shown in Fig. 3, and will extend above the preceding undulations 21 and 23.

To facilitate rotation of the rod 20, the end of the rod 20 extending above the bearing 16 is bent to form a large handle 30, which lies in the same plane as the undulations of the rod on one side of the line between the bearings, extended. The size of the handle 30, taken together with the closeness of the bearings 16 and 17 to the lay-cage 11, prevents the handle 30 from being turned toward the lay-cage more than a few degrees. The possible rotation of the rod 20 is thereby confined to the oscillation of approximately 180 degrees between the two positions shown in Figs. 2 and 3.

The other end 31 of the rod 20, extending through the lower bearing 17 is also offset slightly, toward the opposite side of the line between bearings, extended, from that of the handle 30. Thus when the handle 30 is moved outwardly away from the lay-cage the end 31 will be rotated inwardly toward the lay-cage. The ear 15 has an extension or finger 32 which is bent down into the area in which the end 31 rotates but which may be resiliently pushed aside by the end 31 under pressure. At each oscillation of the handle 30 between the upward position shown in Fig. 2 and the downward position shown in Fig. 3, the end 31 will move against the finger 32, and will be held thereby, preventing accidental oscillation of the rod 20, but requiring only slight pressure to overcome the resistance of the finger 32.

An indicator 33 is mounted on the rod 20. This indicator may be a simple bent wire, or any weight having a hook or handle or bight at one end by which it may be suspended from the rod 20. As shown in Fig. 1, it is a loop of wire, but the precise form is optional, the loop illustrated being a form not easily lost.

When a hen is placed in the lay-cage, the indicator 33 is moved to the upper end of the rod 20 between the bearings 16 and 17, reposing in the undulation 22. When an egg is picked up from that lay-cage, the poultryman flips the handle 30 upwardly and the indicator 33 moves automatically, by gravity, to the undulation 23. For the next egg the handle 30 is flipped down, and the indicator 33 moves to the undulation 24. Thus with an egg-counter on each cage, the poultryman can have at a glance a comparative laying-record of his hens. To facilitate the count, the undulations may be divided into sub-series, each sub-series being painted a different color or otherwise marked distinguishably from its neighbors. Suppose the sub-series to be colored respectively red, white, and green, beginning at the upper end of the rod 20. If at the end of a certain time, the indicator 33 on a certain lay-cage has not been moved to the white series, but is still on red, the hen occupying that cage may be deemed an inferior layer, to be sold at market. The poultryman is thus able to weed out his flock, having positive records of good and bad layers.

I claim:

1. An egg counter comprising a member adapted to be fastened to a lay-cage and having spaced bearings at its opposite ends, the bearing at one end being elevated above the bearing at the other end, an inclined rod rotatable in said bearings and bent in one plane in a series of undulations and provided with a handle by which it may be oscillated, and an indicator suspended on said rod, said indicator moving to the next lower undulation of said rod at each half-oscillation of said rod.

2. An egg counter comprising a member adapted to be fastened to a lay-cage and having spaced inclined bearings for holding a rod at an inclination from the horizontal, a rod rotatable in said bearings having a portion between said bearings bent in a series of undulations, an indicator suspended on said rod and movable lengthwise thereof, and handle means for oscillating said rod to positions one-half turn of said rod apart, in which positions said undulations lie in a vertical plane, an upper but downwardly extending undulation lying below the next lower but upwardly extending undulation and above the following lower and downwardly extending undulation, whereby each half-turn oscillation of said rod causes said indicator to move downwardly along said rod a distance of half a complete undulation.

3. An egg counter as set forth in claim 2 including spring means yieldably and selectively urging said rod to either of said two positions.

4. An egg counter as set forth in claim 2 in which said series of undulations is divided into sub-series, each sub-series having distinctive marking.

References Cited in the file of this patent

UNITED STATES PATENTS

| | | |
|---|---|---|
| 2,474,965 | Wilson | July 5, 1949 |
| 2,741,211 | Lynch | April 10, 1956 |